United States Patent
Hwang et al.

(10) Patent No.: US 9,884,775 B2
(45) Date of Patent: Feb. 6, 2018

(54) SUPERHYDROPHILIC SURFACE BODY, FABRICATING METHOD THEREOF, AND FILTER FOR OIL AND WATER SEPARATION

(71) Applicant: POSTECH ACADEMY-INDUSTRY FOUNDATION, Pohang-si (KR)

(72) Inventors: Woon Bong Hwang, Pohang-si (KR); Handong Cho, Seoul (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 15/387,467

(22) Filed: Dec. 21, 2016

(65) Prior Publication Data

US 2017/0190857 A1    Jul. 6, 2017

(30) Foreign Application Priority Data

Jan. 4, 2016    (KR) .................. 10-2016-0000486

(51) Int. Cl.
  *C02F 1/40*    (2006.01)
  *B01D 15/00*    (2006.01)
  (Continued)

(52) U.S. Cl.
  CPC ................ *C02F 1/40* (2013.01); *B01D 17/02* (2013.01); *B01D 17/10* (2013.01)

(58) Field of Classification Search
  CPC ............ C02F 1/40; B01D 17/01; B01D 17/10
  See application file for complete search history.

(56) References Cited

U.S. PATENT DOCUMENTS

| 8,293,140 B2 * | 10/2012 | Epstein .................. B82Y 30/00 252/500 |
| 2007/0034836 A1 * | 2/2007 | Epstein .................. B82Y 30/00 252/500 |

(Continued)

FOREIGN PATENT DOCUMENTS

| KR | 10-1303059 B1 | 9/2013 |
| KR | 10-1404128 B1 | 6/2014 |
| KR | 10-1437871 B1 | 9/2014 |

OTHER PUBLICATIONS

Chiou, Nan-Rong et al., "Growth and alignment of polyaniline nanofibres with superhydrophobic, superhydrophilic and other properties", nature nanotechnology, vol. 2, Jun. 2007, pp. 354-357.

(Continued)

*Primary Examiner* — Pamela H Weiss
(74) *Attorney, Agent, or Firm* — McDermott Will & Emery LLP

(57) ABSTRACT

Disclosed are a superhydrophilic surface body, a fabricating method thereof, and a filter for oil and water separation, including a superhydrophilic surface. The method for fabricating a superhydrophilic surface body includes a first step of forming a polyaniline nanofiber layer on a surface of a base material, a second step of changing the polyaniline nanofiber layer into a completely oxidized pernigraniline base state, a third step of forming a self-assembled monomolecular film having a polymer polymerization initiation functional group on a surface of the polyaniline nanofiber layer, and a fourth step of forming a silica layer on a surface of the self-assembled monomolecular film. In the third step, the polyaniline nanofiber layer is reduced to a leucoemeraldine state.

8 Claims, 17 Drawing Sheets
(8 of 17 Drawing Sheet(s) Filed in Color)

(51) Int. Cl.
  *B01D 17/02*     (2006.01)
  *B01D 17/00*     (2006.01)

(56)           References Cited

U.S. PATENT DOCUMENTS

| 2011/0229706 | A1* | 9/2011  | Epstein ................. | B82Y 30/00  |
|              |     |         |                           | 428/292.1   |
| 2011/0240556 | A1* | 10/2011 | Hoek ................. | B01D 67/0011 |
|              |     |         |                           | 210/650     |
| 2011/0281098 | A1* | 11/2011 | Gospodinova ..... | C08G 73/0266 |
|              |     |         |                           | 428/220     |
| 2015/0273404 | A1* | 10/2015 | Hoek ....................... | C08K 5/17 |
|              |     |         |                           | 525/540     |

OTHER PUBLICATIONS

Cho, Handong et al., "A simple fabrication method for mechanically robust superhydrophobic surface by hierarchical aluminum hydroxide structures", Current Aplied Physics 13 (2013), pp. 762-767.

Cho, Handong et al., "Durable superhydrophilic/phobic surfaces based on green patina with corrosion resistance", Phys. Chem. Chem. Phys., 2015, 17, pp. 6786-6793.

* cited by examiner

Leucoemeraldine state (LEB)

SUPERHYDROPHILIC SURFACE BODY, FABRICATING METHOD THEREOF, AND FILTER FOR OIL AND WATER SEPARATION

CROSS-REFERENCE TO RELATED APPLICATION

This application claims priority to and the benefit of Korean Patent Application No. 10-2016-0000486 filed in the Korean Intellectual Property Office on Jan. 4, 2016, the entire contents of which are incorporated herein by reference.

BACKGROUND OF THE INVENTION (a) Field of the Invention

The present invention relates to a superhydrophilic surface body, a fabricating method thereof, and a filter for oil and water separation, which includes a superhydrophilic surface.

(b) Description of the Related Art

The wettability refers to the degree of wetting of a solid surface by water, and is expressed as a contact angle of any liquid with respect to a base material when the liquid is brought into contact with the base material. Superhydrophilicity exhibits a property that a water drop rapidly diffuses while the contact angle between water and a base material is 10° or less. A superhydrophilic surface may be fabricated by a method of forming a fine unevenness structure on the surface of a base material or coating the surface of the base material with a material having a high surface energy.

As a method of making a fine unevenness structure, a micro-electromechanical system (MEMS) process, an etching process using a chemical solution, an anodic oxidation process, and the like are disclosed. However, these methods have drawbacks in that materials to which these methods can be applied are limited and it is difficult to apply these methods to a base material having a complicated shape and a large size. As a material having a high surface energy, titanium oxide ($TiO_2$) which is a photocatalyst and is biologically and chemically stable may be considered, but a $TiO_2$ coating layer has a drawback in that the binding force with a base material is weak.

Meanwhile, the wettability of the surface may be utilized in order to separate water and oil from a mixed solution of water and oil. For example, when the surface of a filter is made to be superhydrophilic, water easily passes through the filter, whereas oil is repelled by water absorbed on the surface of the filter, and as a result fails to pass through the filter. The oil and water separation method has merits in that the method is eco-friendly because the structure of the method is simple and consumable products or external energy sources are not required, and the oil recovery rate is high.

However, filters for oil and water separation in the related art, which have a superhydrophilic surface, act under low pressure, and as a result, the throughput thereof is limited, and oil passes through the filter under high pressure regardless of the wettability of the surface, and as a result, the separation efficiency is reduced. Further, commercially widely used polymer filters are usually fabricated by using hydrophobic materials, and since the hydrophobic materials have poor adhesion characteristics with respect to a coating material and it is difficult to modify the surface of the hydrophobic material, it is difficult to fabricate the surface of the hydrophobic material so as to maintain superhydrophilicity.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a superhydrophilic surface body which can be applied to various materials and exhibits stable wetting characteristics, a fabricating method thereof, and a filter for oil and water separation, in which the separation efficiency does not deteriorate even high pressure because a superhydrophilic surface fabricated by the method is provided.

An exemplary embodiment of the present invention provides a method for fabricating a superhydrophilic surface body, the method including: a first step of forming a polyaniline nanofiber layer on a surface of a base material; a second step of changing the polyaniline nanofiber layer into a completely oxidized pernigraniline base state; a third step of forming a self-assembled monomolecular film having a polymer polymerization initiation functional group on a surface of the polyaniline nanofiber layer; and a fourth step of forming a silica layer on a surface of the self-assembled monomolecular film.

In the first step, the base material may be immersed into an aniline monomer solution, and the polyaniline nanofiber layer may be formed in an emeraldine salt state at low temperature by oxidative polymerization. The aniline monomer solution may include at least one of ammonium persulfate, potassium persulfate, and sodium persulfate and at least one of perchloric acid, hydrochloric acid, camphor sulfonic acid, p-toluene sulfonic acid, and dodecylbenzenesulfonic acid.

Prior to the first step, any one pre-treatment procedure of sand blasting, dry etching, wet etching, a plasma treatment, and a UV treatment may be carried out on the base material. In the second step, the polyaniline nanofiber layer may be ultrasonically washed with deionized water, and then dried in an oven.

In the third step, the self-assembled monomolecular film may include any one of 2-dimethylaminoethanethiol (DMAET) and 2-(dimethylamino)ethyl methacrylate (DMAEMA), and may be formed by an immersion method. In the third step, the polyaniline nanofiber layer is reduced to a leucoemeraldine state.

In the fourth step, the silica layer may be formed by a method of immersing the base material subjected to the third step into a monosilicic acid solution.

Another embodiment of the present invention provides a superhydrophilic surface body including a polyaniline nanofiber layer in a leucoemeraldine state and formed on a surface of a base material, a self-assembled monomolecular film formed on a surface of the polyaniline nanofiber layer, and a silica layer formed on a surface of the self-assembled monomolecular film.

The self-assembled monomolecular film may include any one of 2-dimethylaminoethanethiol (DMAET) and 2-(dimethylamino)ethyl methacrylate (DMAEMA).

Still another embodiment of the present invention provides a filter for oil and water separation, including a porous film and a superhydrophilic surface body formed on a surface of the porous film. The superhydrophilic surface body includes a polyaniline nanofiber layer in a leucoemeraldine state and formed on a surface of a porous film, a self-assembled monomolecular film formed on a surface of the polyaniline nanofiber layer, and a silica layer formed on a surface of the self-assembled monomolecular film.

The self-assembled monomolecular film may include any one of 2-dimethylaminoethanethiol (DMAET) and 2-(dimethylamino)ethyl methacrylate (DMAEMA).

According to the present exemplary embodiment, a superhydrophilic surface body may be fabricated by a method of simply immersing a base material into a solution without using a complicated apparatus, and a superhydrophilic surface body may be implemented regardless of the material, shape, and size of the base material. Further, the superhydrophilic surface body and the filter for oil and water separation according to the present exemplary embodiment may effectively improve the sustainability of the surface wettability.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Hereinafter, exemplary embodiments of the present invention will be described in detail with reference to accompanying drawings, such that a person skilled in the art to which the present invention pertains can easily carry out the present disclosure. The present invention can be implemented in various different forms, and is not limited to the exemplary embodiments described herein.

Figure 1:
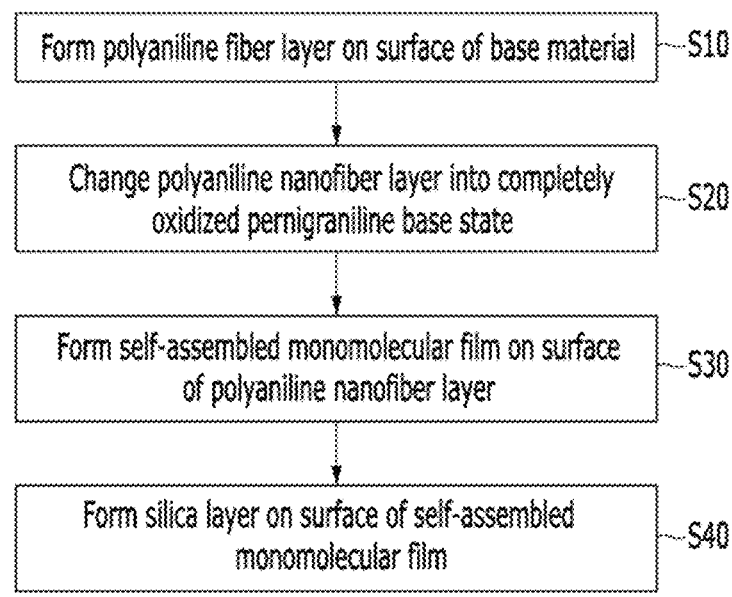
FIG. 1 is a process flowchart illustrating a method for fabricating the superhydrophilic surface body according to an exemplary embodiment of the present invention.

FIG. 1 is a process flowchart illustrating a method for fabricating the superhydrophilic surface body according to an exemplary embodiment of the present invention.

Referring to FIG. 1, the method for fabricating a superhydrophilic surface body of the present exemplary embodiment largely includes: a first step (S10) of forming a polyaniline nanofiber layer on a surface of a base material; a second step (S20) of changing the polyaniline nanofiber layer into a completely oxidized pernigraniline base state; a third step (S30) of forming a self-assembled monomolecular film having a polymer polymerization initiation functional group on a surface of the polyaniline nanofiber layer; and a fourth step (S40) of forming a silica layer on a surface of the self-assembled monomolecular film.

FIGS. 2A to 2D are schematic diagrams illustrating the superhydrophilic surface body at each step in the process flowchart illustrated in FIG. 1, and show a chemical formula in a region surrounded by dotted lines.

Figure 2A:
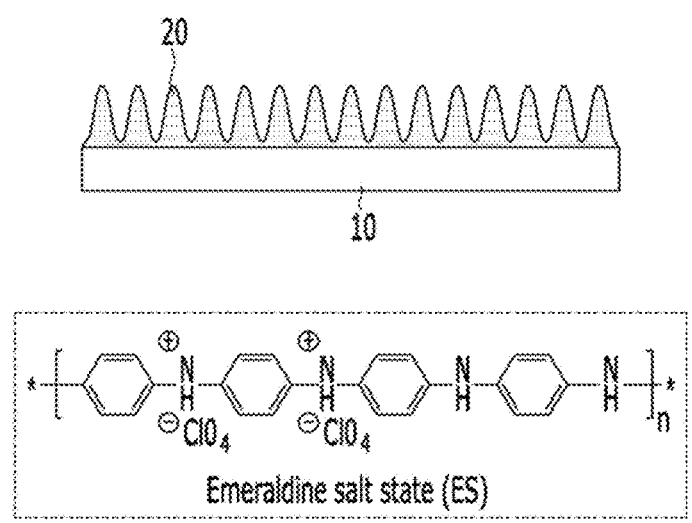
FIGS. 2A to 2D are schematic diagrams illustrating the superhydrophilic surface body at each step in the process flowchart illustrated in FIG. 1.

Referring to FIG. 2A, in the first step (S10), a base material 10 is immersed into an aniline monomer solution, and a polyaniline (PANI) nanofiber layer 20 is formed on a surface of the base material 10 at low temperature by oxidative polymerization. The aniline monomer solution may be prepared by introducing an aniline monomer into a solution including an oxidant and an acid.

The oxidant may include at least one of ammonium persulfate $((NH_4)_2S_2O_8)$, potassium persulfate $(K_2S_2O_8)$, and sodium persulfate $(Na_2S_2O_8)$. The acid may be an inorganic acid or an organic acid, and may include at least one of perchloric acid $(HClO_4)$, hydrochloric acid (HCl), camphor sulfonic acid, p-toluene sulfonic acid, and dodecylbenzenesulfonic acid.

The concentration of the acid in the aniline monomer solution may be 0.1 M to 2 M, and the concentration of the aniline monomer in the aniline monomer solution may be 0.5 M or less. The oxidant may be introduced at a concentration of 80% or less of the concentration of the aniline monomer. During the oxidative polymerization, the temperature of the aniline monomer solution may be 0° C. to 5° C., and the reaction time may be within 24 hours.

Prior to the first step (S10), a pre-treatment procedure to broaden the surface area of the base material 10 or induce a chemical functional group may be carried out in order to enhance the adhesive force between the base material 10 and the polyaniline nanofiber layer 20. For example, before the base material 10 is immersed into the aniline monomer solution, any one pre-treatment procedure of sand blasting, dry etching, wet etching, a plasma treatment, and a UV treatment may be carried out on the base material 10.

Polyaniline is a representative conductive polymer material, and is applied to various industrial fields such as a device of sensing a chemical, an energy application device, and a filtration device due to simple fabrication processes, a low price, and excellent chemical stability. In particular, polyaniline nanofibers having various shapes may be fabricated through the oxidative polymerization procedure.

Figure 2B:
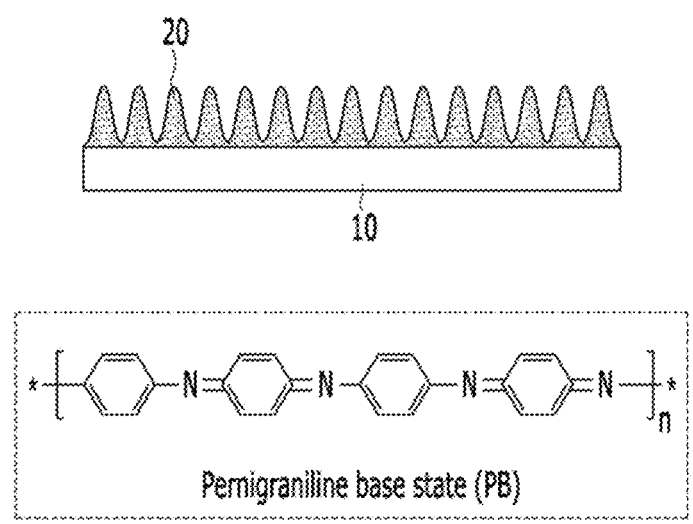

Referring to FIG. 2B, in the second step (S20), the polyaniline nanofiber layer 20 is washed with deionized water to remove the solution and polyaniline aggregates remaining on the surface, and is dried in an oven and then changed into a completely oxidized pernigraniline base state. In this case, the ultrasonic cleaning may be carried out within 5 minutes for effective washing.

Various structures are present depending on the oxidation state of polyaniline, and there are a completely oxidized pernigraniline base state (PB) and a completely reduced leucoemeraldine state (LEB). In the first step (S10), when aniline is polymerized by oxidative polymerization, polymerization is carried out in an emeraldine salt state (ES) which is an intermediate oxidation state. The emeraldine salt is doped with an anion, and the anion is removed by the washing and drying procedures of the second step (S20), and polyaniline is changed from the emeraldine salt state (ES) to the pernigraniline base state (PB) while being oxidized.

Figure 2C:
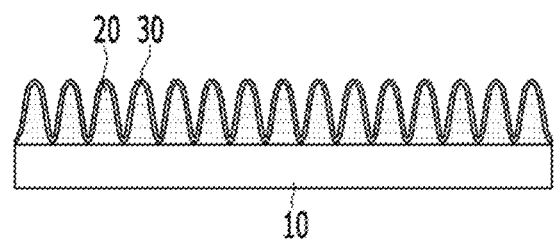
Figure 2C:
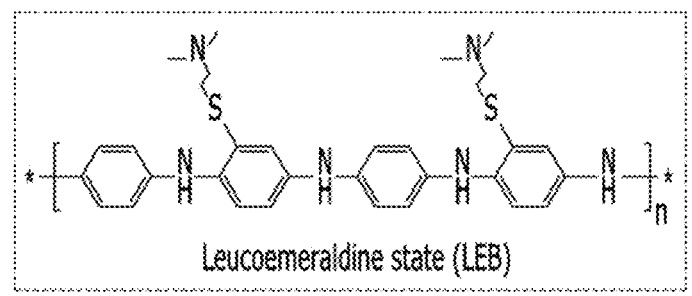

Referring to FIG. 2C, in the third step (S30), a self-assembled monomolecular film 30 having a polymer polymerization initiation functional group is formed on the surface of the polyaniline nanofiber layer 20. In the third step (S30), the polyaniline nanofiber layer 20 is reduced to the leucoemeraldine state.

The self-assembled monomolecular film 30 may include any one of 2-dimethylaminoethanethiol (DMAET) and 2-(dimethylamino)ethyl methacrylate (DMAEMA).

In the case of DMAET, when the base material 10 on which the polyaniline nanofiber layer 20 is formed is immersed into a DMAET hydrochloride solution, DMAET is coated in the form of a monomolecular film on the surface of the polyaniline nanofiber layer 20. The DMAET hydrochloride solution may be prepared by dissolving DMAET at a concentration of 1 mM to 10 mM in anhydrous ethanol. The immersion time is within 12 hours, and after the self-assembled monomolecular film 30 is coated, the base material 10 is washed with deionized water and dried.

The self-assembled monomolecular film 30 is composed of head groups which achieves adsorption through binding to chemical groups on the surface and terminal groups which impart the functionality. DMAET includes a thiol group (—SH) which is a head group and a tertiary amine group which is a terminal group. The thiol group forms a covalent bond with the benzene of polyaniline, and the tertiary amine group serves as a polymer initiator.

Figure 2D:
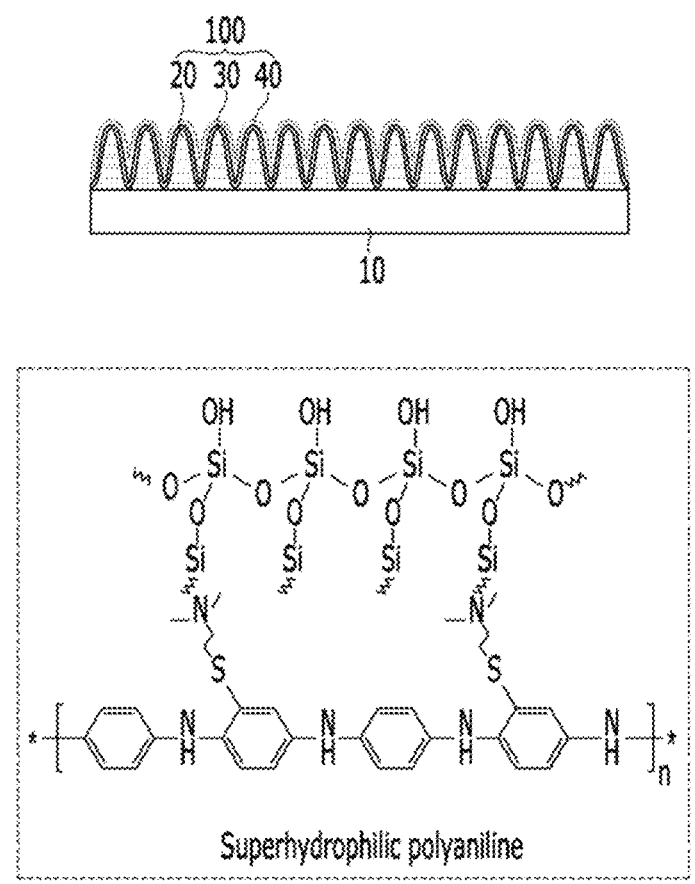
Figure 3A:
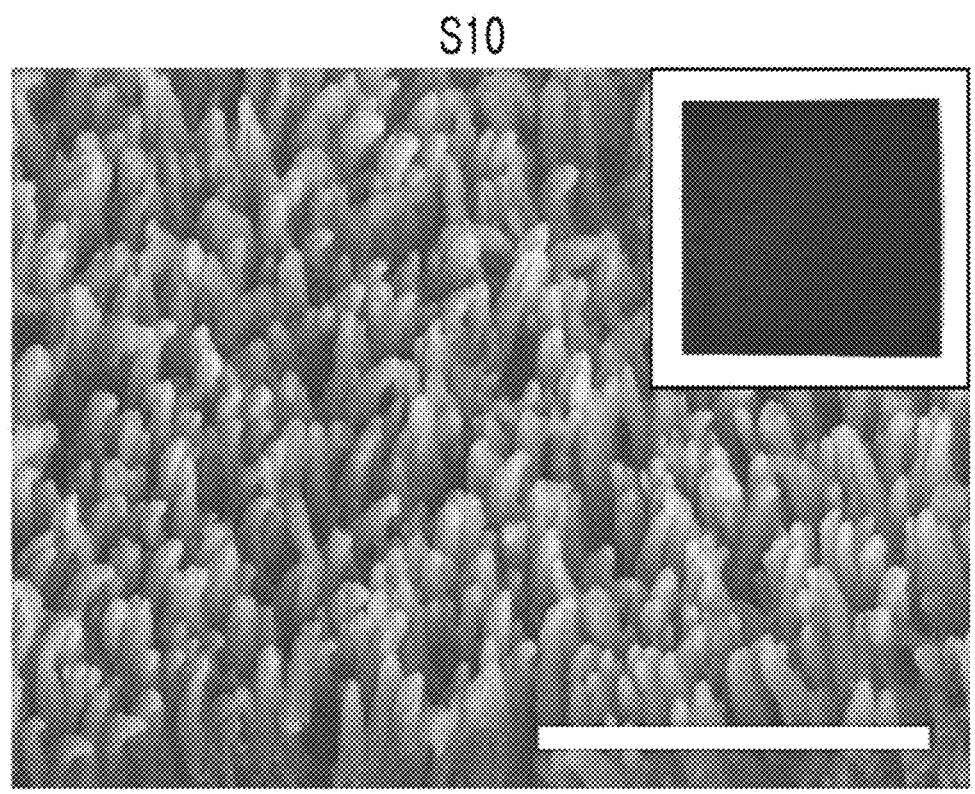
FIGS. 3A to 3D are photographs and scanning electron microscope (SEM) photographs illustrating the superhydrophilic surface body at each step in the process flowchart illustrated in FIG. 1.
Figure 3B:
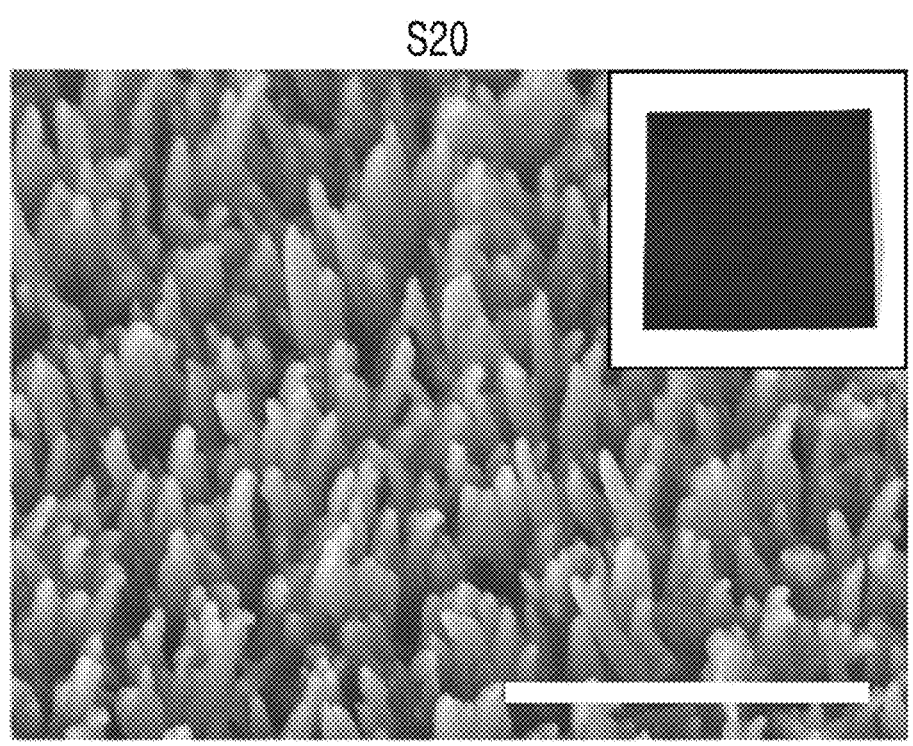
Figure 3C:
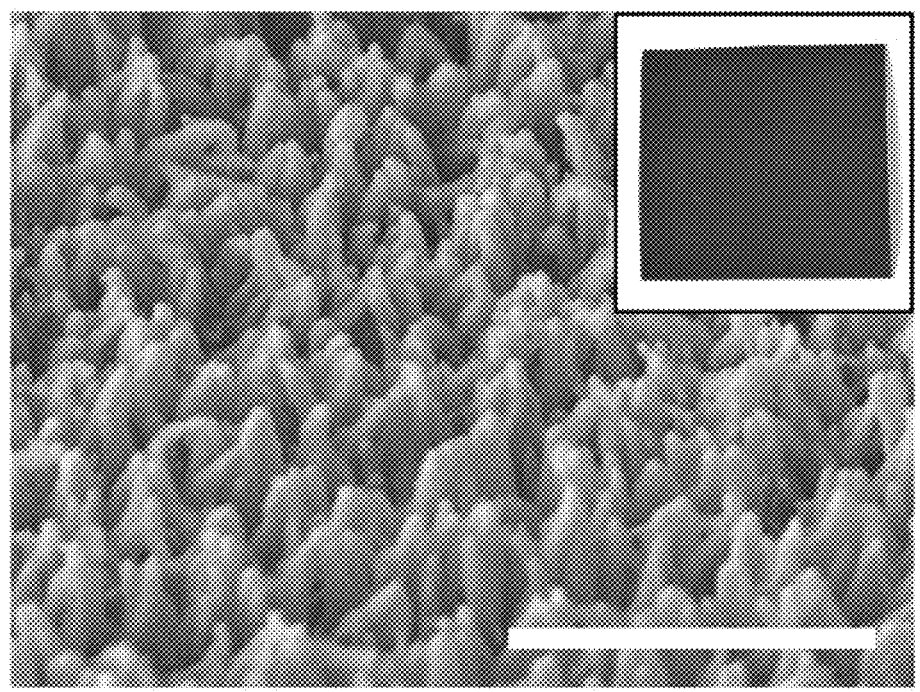
Figure 3D:
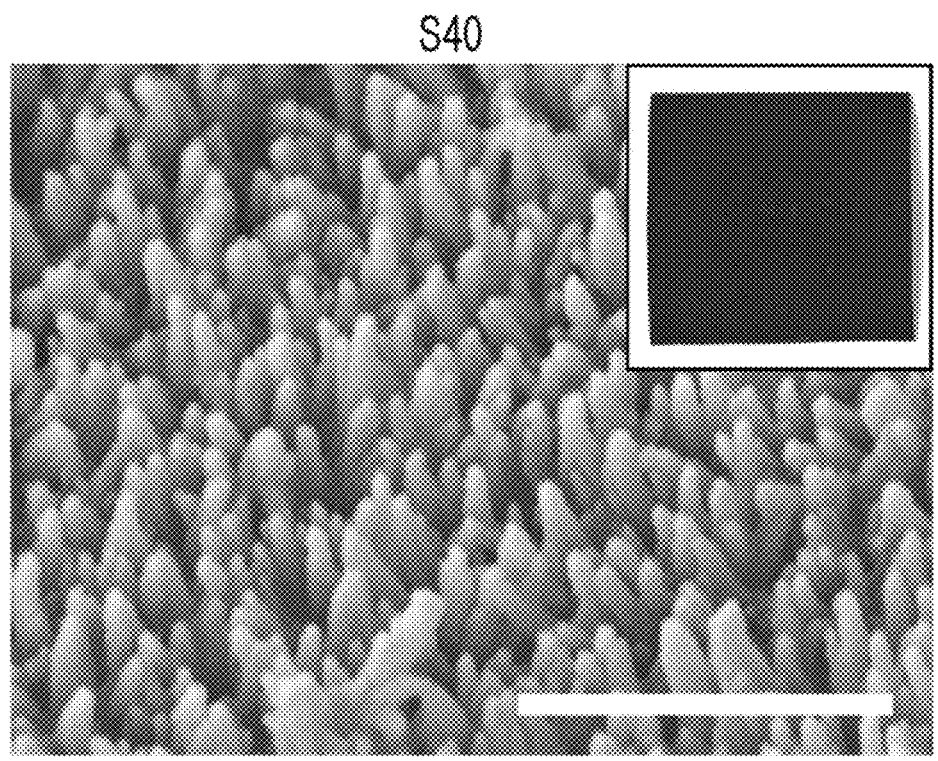

Referring to FIG. 2D, in the fourth step (S40), a silica layer 40 is formed on the surface of the self-assembled monomolecular film 30. When the base material 10 on which the self-assembled monomolecular film 30 is formed is immersed into a monosilicic acid solution, the polymerization reaction is facilitated by the tertiary amine group to form a silica structure. The immersion time may be approximately 1 hour, the silica layer 40 is formed, and then the base material 10 is washed with deionized water and dried in an oven.

The monosilicic acid solution may be prepared by mixing a first solution and a second solution at the same ratio immediately before being used. The first solution may be prepared by putting 0.1 M of tetramethyl orthosilicate (TMOS) into a 1 mM hydrochloric acid solution and stirring the resulting mixture for 15 minutes. The second solution may be a phosphate buffer solution having a concentration of 0.1 M and a pH value of 6.

Since the silica layer 40 includes a large amount of hydroxyl groups, the surface exhibits superhydrophilicity and forms a chemically stable bond, and as a result, wetting characteristics are sustained for a long period of time.

A superhydrophilic surface body 100 of the present exemplary embodiment includes the polyaniline nanofiber layer 20 in a completely reduced leucoemeraldine state and formed on the surface of the base material 10, the self-assembled monomolecular film 30 formed on the surface of the polyaniline nanofiber layer 20, and the silica layer 40 formed on the surface of the self-assembled monomolecular film 30.

When a superhydrophilic surface body composed only of the polyaniline nanofiber layer 20 is assumed without the self-assembled monomolecular film 30 and the silica layer 40, the sustainability of the surface wetting characteristics deteriorates due to the loss of doping ions generated in the washing and drying procedure. However, in the superhydrophilic surface body 100 of the present exemplary embodiment, the sustainability of surface wetting characteristics may be effectively improved by the self-assembled monomolecular film 30 and the silica layer 40.

Furthermore, the above-described fabricating method may fabricate a superhydrophilic surface body 100 by a procedure to simply immerse the base material 10 into a solution without using a complicated apparatus, and may implement the superhydrophilic surface body 100 regardless of the material, shape, and size of the base material 10.

FIGS. 3A to 3D are photographs and scanning electron microscope (SEM) photographs illustrating the superhydrophilic surface body at each step in the process flowchart illustrated in FIG. 1. In the scanning electron microscope photographs, the white bar denotes 1 micrometer ($\mu$m).

Referring to FIGS. 3A to 3D, in the first to fourth steps (S10, S20, S30, and S40), the shapes of the nanofibers in the polyaniline nanofiber layer, the self-assembled monomolecular film, and the silica layer do not vary, but after the silica layer is formed in the fourth step (S40), the thickness of the superhydrophilic surface body is slightly increased.

The surface on which the polyaniline nanofiber layer is formed in the first step (S10) assumed dark green, but the color turned indigo in the second step (S20), the self-assembled monomolecular film was coated, and then the surface again showed dark green in the third step (S30), and a silica layer is formed, and then the self-assembled monomolecular film again turned indigo in the fourth step (S40).

The color change is a result of the oxidation state of polyaniline, and means that the color was changed into an emeraldine salt (green), a pernigraniline base state (indigo), and a leucoemeraldine state (green) in this order. Moreover, the color change after the silica coating in the fourth step (S40) is caused by the scattering of the surface of the silica layer.

Figure 4:
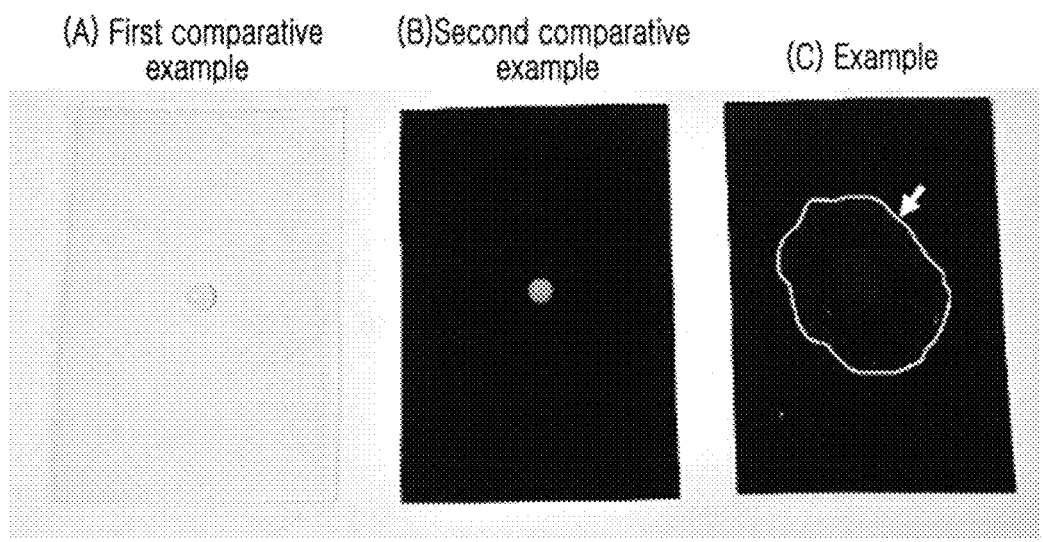
FIG. 4 is a photograph illustrating a film (A) in the first Comparative Example, a film (B) in the second Comparative Example, and a polyolefin film (C) including the superhydrophilic surface body of the present exemplary embodiment.

FIG. 4 is a photograph illustrating a film (A) in the first Comparative Example, a film (B) in the second Comparative Example, and a polyolefin film (C) including the superhydrophilic surface body of the present exemplary embodiment. The film (A) in the first Comparative Example is an untreated polyolefin film, and the film (B) in the second Comparative Example is a polyolefin film in which a polyaniline nanofiber layer is formed.

Referring to FIG. 4, when a water drop was dropped onto the three films, the water drop rapidly diffuses on the superhydrophilic surface body (C) of the present exemplary embodiment, but the water drop maintains a spherical shape on the surfaces of the films (A and B) in the first and second Comparative Examples, and accordingly, it can be seen that these surfaces are hydrophobic. The white line and arrow in FIG. 4 (C) indicate the edge of the spread water drop.

Figure 5:
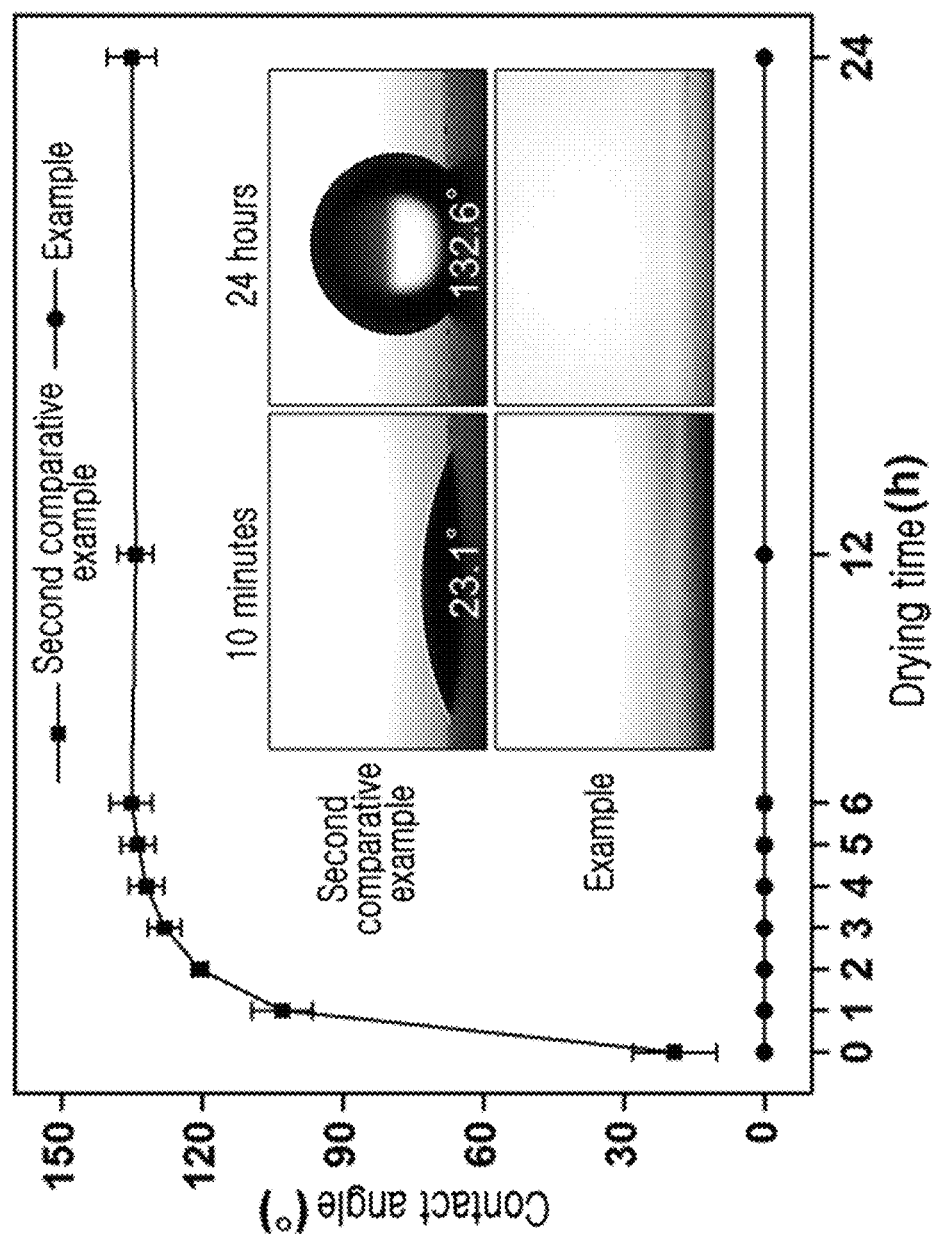
FIG. 5 is a graph illustrating a change in contact angle according to the oven-drying time in the film (B) in the second Comparative Example and the polyolefin film (C) including the superhydrophilic surface body of the present exemplary embodiment.

FIG. 5 is a graph illustrating a change in contact angle according to the oven-drying time in the film (B) in the second Comparative Example and the polyolefin film (C) including the superhydrophilic surface body of the present exemplary embodiment.

Referring to FIG. 5, the film (B) in the second Comparative Example initially exhibited a hydrophilicity of approximately 20°, but turned hydrophobic after being dried in an oven for 24 hours, and exhibited a contact angle of 130° or more. However, the superhydrophilic surface body of the present exemplary embodiment had no change in contact angle which was 0°, and exhibited stable wetting characteristics, regardless of the oven drying time.

Figure 6:
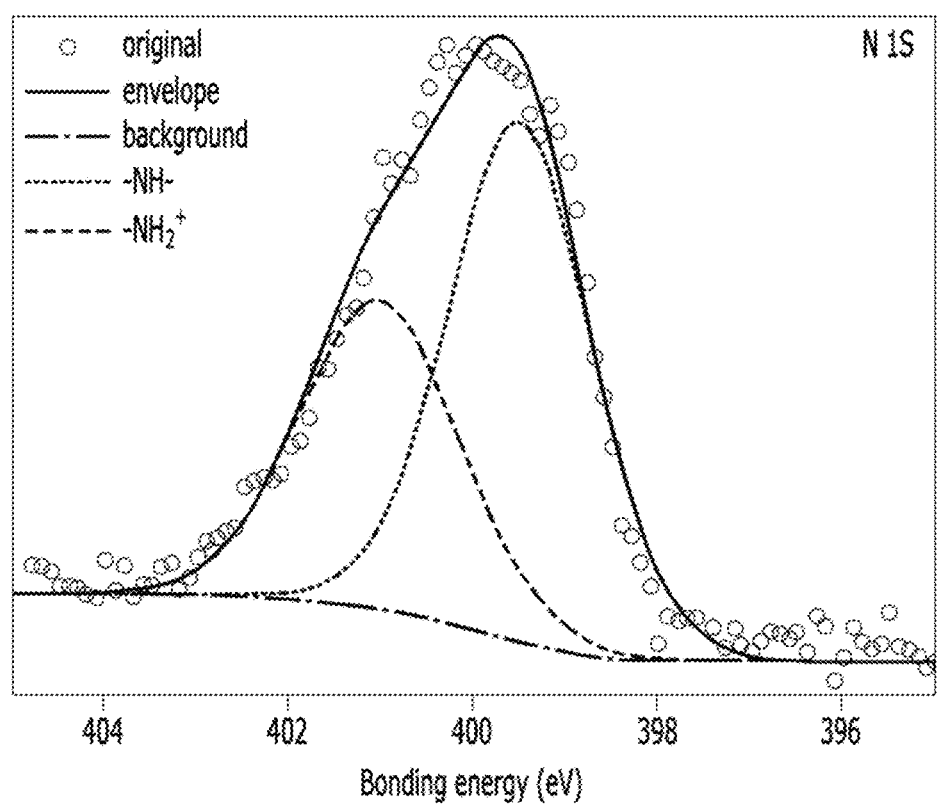
FIG. 6 is a graph illustrating X-ray photoelectron spectroscopy (XPS) N 1s spectrum analysis results for the surface of the polyaniline nanofiber after the film in the second Comparative Example is dried in an oven for 10 minutes.
Figure 7:
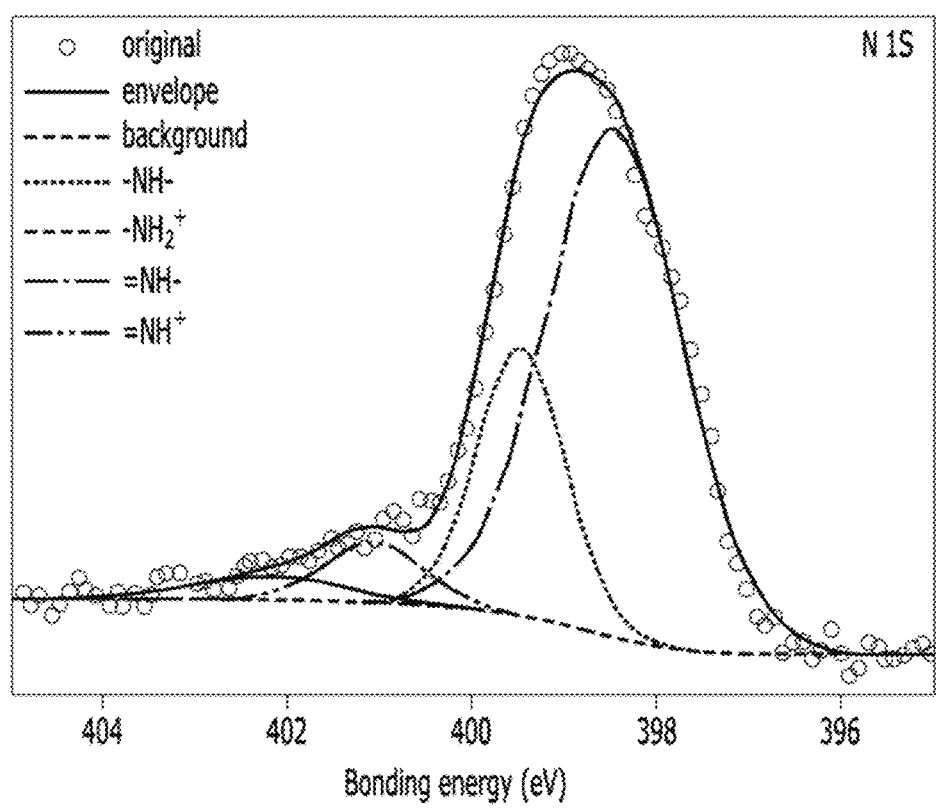
FIG. 7 is a graph illustrating X-ray photoelectron spectroscopy (XPS) N 1s spectrum analysis results for the surface of the polyaniline nanofiber after the film in the second Comparative Example is dried in an oven for 24 hours.

FIG. 6 is a graph illustrating X-ray photoelectron spectroscopy (XPS) N 1s spectrum analysis results for the surface of the polyaniline nanofiber after the film in the second Comparative Example is dried in an oven for 10 minutes, and FIG. 7 is a graph illustrating X-ray photoelectron spectroscopy (XPS) N 1s spectrum analysis results for the surface of the polyaniline nanofiber after the film in the second Comparative Example is dried in an oven for 24 minutes.

Referring to FIGS. 6 and 7, it can be seen that after the film was dried for 10 minutes, a cationized amine group (—NH$^+$) appeared, but after the film was dried for 24 hours, the ratio of the amine group was decreased. Further, it can be seen that when the drying time is prolonged, the amine group is oxidized, and as a result, an immine (=N—) group component is increased. Through this, it can be confirmed that the chemical state change of polyaniline in the drying process is a cause of changing the wetting characteristics of the surface.

In contrast, the superhydrophilic surface body of the present exemplary embodiment is not affected by the chemical state change of polyaniline by a silica layer, and stable superhydrophilic properties are maintained.

Figure 8:
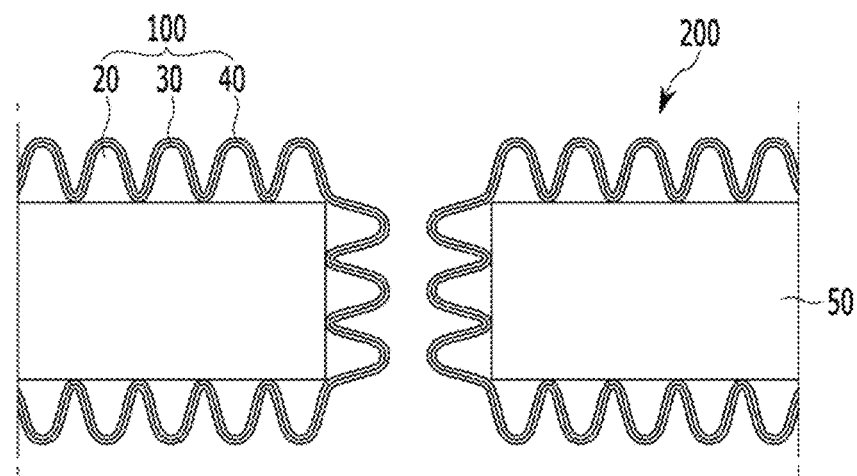
FIG. 8 is a schematic diagram of the filter for oil and water separation according to an exemplary embodiment of the present invention.

FIG. 8 is a schematic diagram of the filter for oil and water separation according to an exemplary embodiment of the present invention.

Referring to FIG. 8, a filter 200 for oil and water separation of the present exemplary embodiment includes a porous film 50 and the superhydrophilic surface body 100 formed on the surface of the porous film 50. The superhydrophilic surface body 100 includes the polyaniline nanofiber layer 20 in a completely reduced leucoemeraldine state and formed on the surface of the porous film 50, the self-assembled monomolecular film 30 formed on the surface of the polyaniline nanofiber layer 20, and the silica layer 40 formed on the surface of the self-assembled monomolecular film 30.

The porous film 50 may be fabricated of a porous polypropylene film or polymer film other than polypropylene.

Figure 9:
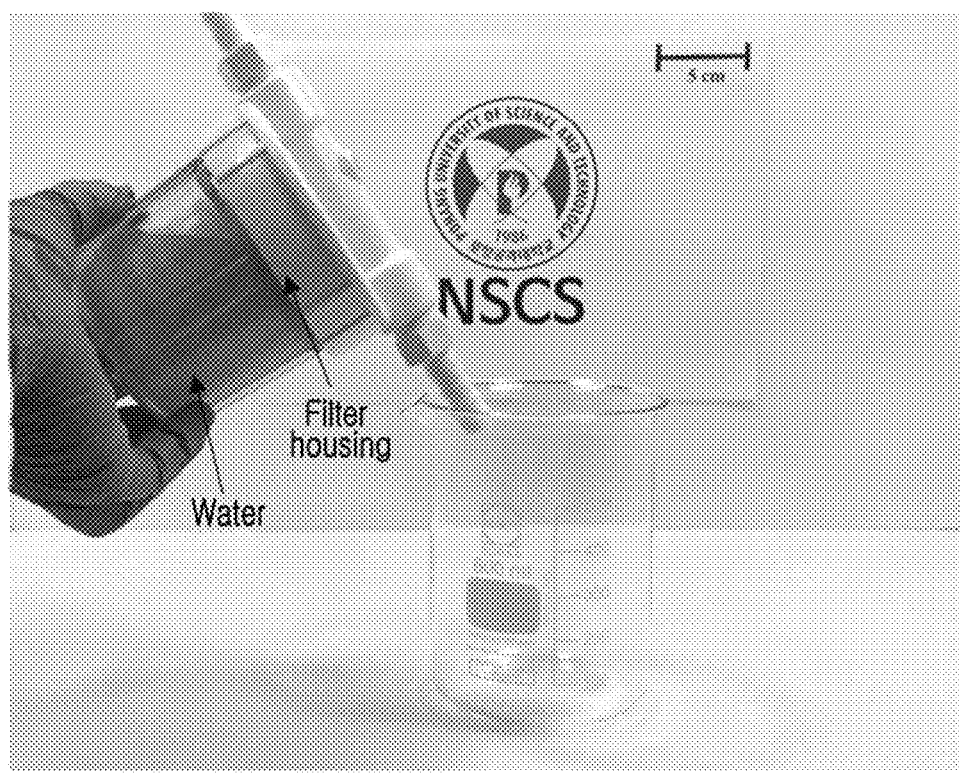
FIG. 9 is a photograph illustrating a water penetration experiment using a filter fabricated of a porous polypropylene film.

FIG. 9 is a photograph illustrating a water penetration experiment using a filter fabricated of a porous polypropylene film. Referring to FIG. 9, it can be seen that polypropylene is a hydrophobic material, and water does not pass through a filter when pressure is not applied thereto.

Figure 10:
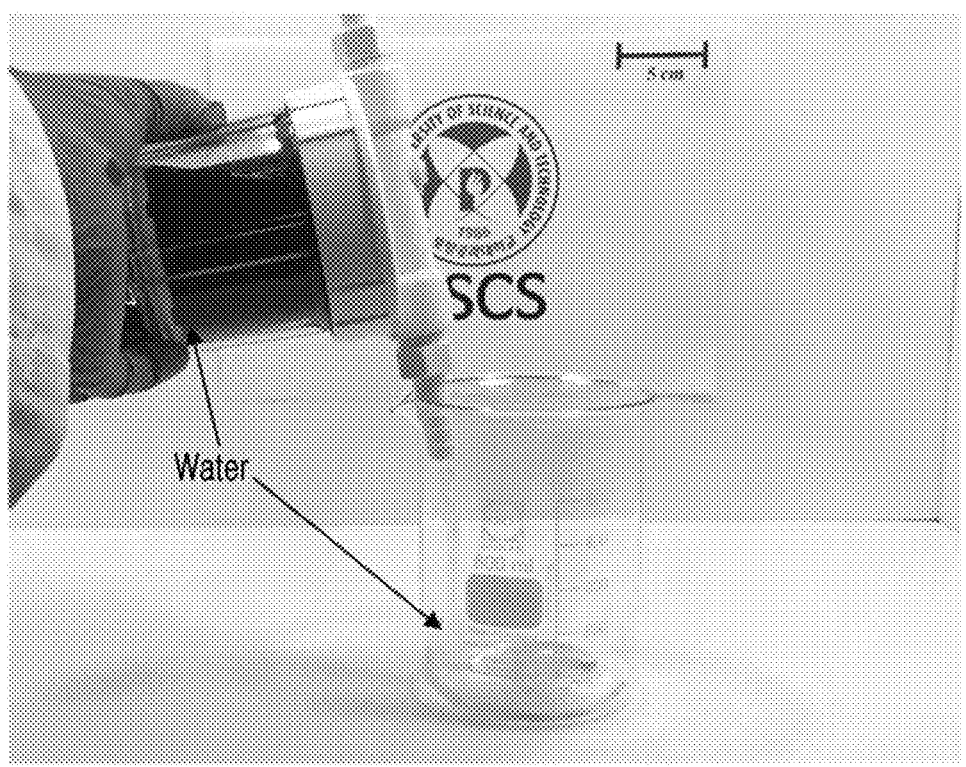
FIG. 10 is a photograph illustrating a water penetration experiment of the filter for oil and water separation of the present exemplary embodiment.

FIG. 10 is a photograph illustrating a water penetration experiment of the filter for oil and water separation of the present exemplary embodiment. The filter for oil and water separation used in the present exemplary embodiment used in an experiment includes a porous polypropylene film and a superhydrophilic surface body. Referring to FIG. 10, it can be seen that in the filter for oil and water separation of the present exemplary embodiment, water passes well through the filter even though pressure is not applied thereto.

Figure 11:
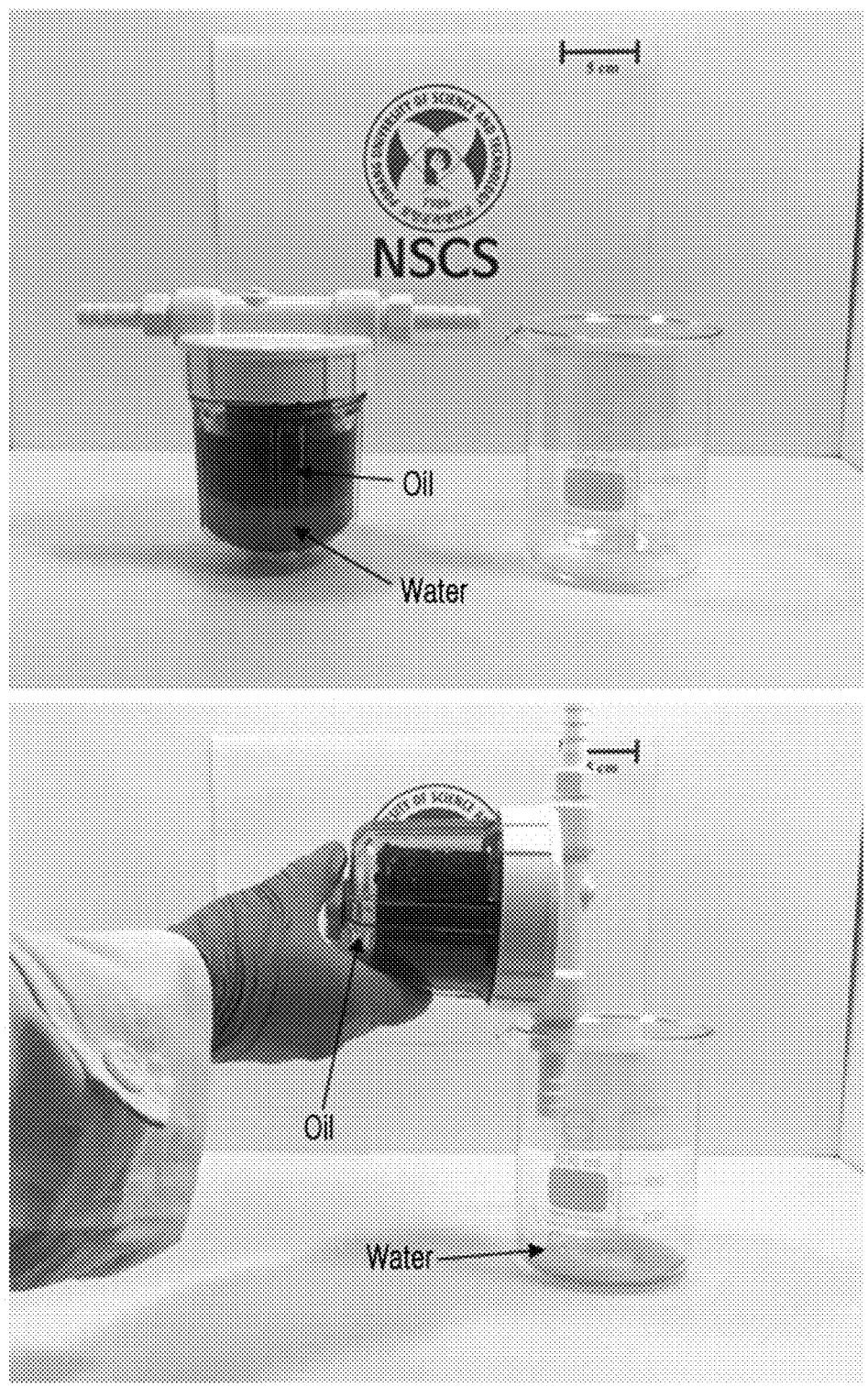
FIG. 11 is a photograph illustrating an oil and water separation experiment of the filter for oil and water separation according to the present exemplary embodiment.

FIG. 11 is a photograph illustrating an oil and water separation experiment of the filter for oil and water separation according to the present exemplary embodiment. Referring to FIG. 11, it can be seen that when a mixture of water and oil is introduced into an outer side of the filter for oil and water separation, and then the filter for oil and water separation is tilted, oil remains and only water passes through the filter for oil and water separation.

The filter for oil and water separation of the present exemplary embodiment separates water and oil at high efficiency under low pressure, and the separation efficiency of water and oil does not deteriorate even under high pressure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for fabricating a superhydrophilic surface body, the method comprising:
   a first step of forming a polyaniline nanofiber layer on a surface of a base material;
   a second step of changing the polyaniline nanofiber layer into a completely oxidized pernigraniline base state;
   a third step of forming a self-assembled monomolecular film having a polymer polymerization initiation functional group on a surface of the polyaniline nanofiber layer; and
   a fourth step of forming a silica layer on a surface of the self-assembled monomolecular film.

2. The method of claim 1, wherein:
   in the first step, the base material is immersed into an aniline monomer solution, and the polyaniline nanofiber layer is formed in an emeraldine salt state at low temperature by oxidative polymerization.

3. The method of claim 2, wherein:
   the aniline monomer solution comprises at least one of ammonium persulfate, potassium persulfate, and sodium persulfate and at least one of perchloric acid, hydrochloric acid, camphor sulfonic acid, p-toluene sulfonic acid, and dodecylbenzenesulfonic acid.

4. The method of claim 1, wherein:
   prior to the first step, any one pre-treatment procedure of sand blasting, dry etching, wet etching, a plasma treatment, and a UV treatment is carried out on the base material.

5. The method of claim 1, wherein:
   in the second step, the polyaniline nanofiber layer is ultrasonically washed with deionized water, and then dried in an oven.

6. The method of claim 1, wherein:
   in the third step, the self-assembled monomolecular film comprises any one of 2-dimethylaminoethanethiol (DMAET) and 2-(dimethylamino)ethyl methacrylate (DMAEMA), and is formed by an immersion method.

7. The method of claim 6, wherein:
   in the third step, the polyaniline nanofiber layer is reduced to a leucoemeraldine state.

8. The method of claim 6, wherein:
   in the fourth step, the silica layer is formed by a method of immersing the base material subjected to the third step into a monosilicic acid solution.

* * * * *